United States Patent

Ando et al.

[11] Patent Number: 6,003,416
[45] Date of Patent: Dec. 21, 1999

[54] TOOL HOLDING DEVICE

[75] Inventors: Kazuhiko Ando, Nara; Michio Oitaka, Osaka, both of Japan

[73] Assignee: Tsubakimoto Chain Co., Osaka-fu, Japan

[21] Appl. No.: 08/622,407

[22] Filed: Mar. 27, 1996

[30] Foreign Application Priority Data

Mar. 29, 1995 [JP] Japan .................................. 7-094248

[51] Int. Cl.⁶ .................. B23B 31/107; B23B 31/22; B23B 31/40
[52] U.S. Cl. .................. 82/160; 279/103; 279/157; 279/2.23; 408/143; 409/233; 409/234
[58] Field of Search ............................. 82/160; 409/233, 409/234; 408/239 R, 239 A, 143; 279/2.23, 103, 157

[56] References Cited

U.S. PATENT DOCUMENTS

| | | | |
|---|---|---|---|
| 1,864,466 | 6/1932 | Peterson | 279/2.23 |
| 4,708,040 | 11/1987 | Erickson | 82/160 |
| 4,850,762 | 7/1989 | Ramunas . | |
| 4,932,295 | 6/1990 | Erickson | 82/160 |
| 5,279,194 | 1/1994 | Armburst | 409/233 |

FOREIGN PATENT DOCUMENTS

| | | |
|---|---|---|
| 61-214939 | 9/1986 | Japan . |
| 4-37695 | 9/1992 | Japan . |
| 220169 | 2/1994 | Japan . |
| 2154479A | 9/1985 | United Kingdom . |

*Primary Examiner*—Steven C. Bishop
*Attorney, Agent, or Firm*—Armstrong, Westerman, Hattori, McLeland & Naughton

[57] ABSTRACT

A tool holding device comprising a tool pot in which an interchangeable tool is releasably fitted and removed, a ball holder firmly fitted in the tool pot and having a guide surface around which a shank portion of the tool is releasably fitted for radially advancing and retracting balls in said ball holder for attachment and detachment of a tool relative to the tool pot and a slide pin in the tool pot to move said balls radially outward to engage the shank of the tool being attached and for movement in an opposite direction for releasing said tool.

1 Claim, 3 Drawing Sheets

TOOL HOLDING DEVICE

FIELD OF THE INVENTION

The present invention relates to the holding of a tool for insertion into and removal from a tool pot.

DESCRIPTION OF RELATED ART

A conventional tool holding means provided on a tool pot is disclosed, for example, in Japanese utility Model Publication No. 4-37695 in which forward and backward movements of a ball pusher, for causing balls to lock and unlock a tool, are initiated via the movement of a pin which is actuated in a direction perpendicular to the reciprocating movement of the ball pusher.

Owing to such indirect operation of the ball pusher, the tool holding means of the prior art described above is complicated in construction and assembly. Furthermore, the relationship, in relative position, between a lowermost position of the ball pusher and an inserted position of the pin should be accurate. If not accurate, the tool cannot be clamped and unclamped reliably due to an inaccurate stroke of reciprocation of the ball pusher. In addition, due to abrasion of a peripheral cam surface of the pin, the tool can only be held unstably in a locked position and, hence, may cause a tool fall-off problem. When the tool is to be detached, the pin is pushed to ensure that the ball pusher can be moved backward. In this instance, however, because the ball pusher is urged forwardly by the spring, the balls should be forced, by a tapered portion of the tool in a radial inward direction, to retract the ball pusher against the force of the spring for the detachment of the tool. Accordingly, a ball engagement recess in the tapered portion is likely to wear out, due to a load acting thereon, when the ball pusher is retracted. As a result, a smooth tool exchange operation cannot be achieved.

BRIEF DESCRIPTION OF THE INVENTION

The present invention seeks to provide a solution to the foregoing problems by way of a tool holding device comprising a tool pot releasably fitting an interchangeable tool therein, a ball holder firmly fitted in the tool pot and having a guide surface around which a shank portion of the tool is releasably fitted, and a tubular portion having formed therein, a plurality of circumferentially spaced radial holes, freely movably holding respectively therein balls releasably engageable with a ball engagement groove, formed in an inner peripheral surface of the shank portion, and a slide pin inserted in the ball holder and normally urged backward in an axial direction, the slide pin having a clamp cam surface for causing the balls to move into engagement with the ball engagement groove in the shank portion, when the slide pin is urged backward, and an unclamp space for allowing the balls to move out of engagement with the ball engagement groove, when the slide pin is advanced, the shank portion having a releasing cam surface, defining a portion of the ball engagement groove, for forcing the balls to move into the unclamp space when the tool is detached.

When the backwardly urged slide pin is pushed forwardly, by an external force, the clamp cam surface of the slide pin is disengaged from the balls and the unclamp space is brought into confrontation with the balls. Thus, upon insertion of the shank portion of the tool in the tool pot, the balls can be readily moved into the unclamp space by the shank portion. The shank portion can therefore be smoothly fitted around the guide surface of the ball holder. When the external pushing force on the slide pin is released, the slide pin moves backward, by the force of the spring, causing the clamp cam surf ace to force the balls into the ball engagement groove in the shank portion to thereby lock the tool in the tool pot.

When, the tool is detached from the tool pot, the slide pin is pushed forwardly by an external force, against the force of the spring, so that the clamp cam surface, of the slide pin, is disengaged from the balls and the unclamp space is brought into confrontation with the balls. Subsequently, the tool is pulled out from the tool pot during which time the releasing cam surface of the shank portion forces the balls into the unclamp space to release the ball engagement groove from locking engagement with the balls. The tool can, therefore, be readily pulled out or detached from the tool pot.

BRIEF DESCRIPTION OF THE DRAWINGS

The present invention will be more fully understood from the following description, taken with the appended drawing in which.

DETAILED DESCRIPTION OF THE INVENTION

Figure 1:
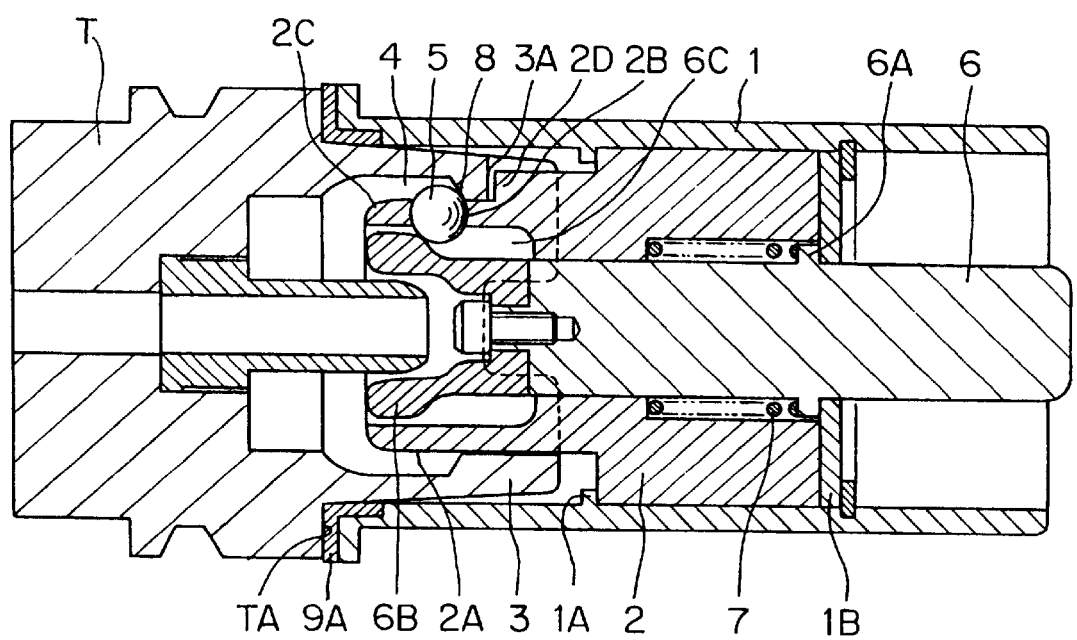
FIG. 1 is a front elevational, cross-sectional view of the invention showing the condition in which a tool is attached.

FIG. 1 shows a cross-sectional view of a tool pot 1 with a tool fitted therein according to an embodiment of the present invention. The tool pot 1 includes a ball holder 2 firmly fitted therein and secured in position between an annular projection 1A of the tool pot 1 and an annular holding plate 1B supported by a stop ring 1C. The ball holder 2 includes a guide surface 2A around which a shank portion 3 of a tool T is releasably fitted, and a tubular portion 2C, having a plurality of circumferentially spaced radial holes 2B in which a plurality of balls 5, arranged in the circumferential direction of the tool pot 1, are freely movably received for engagement and disengagement with an annular ball engagement groove 4 formed in an inner peripheral surface of the shank portion 3. A slide pin 6 is inserted through the ball holder 2, with a spring 7 acting on an annular flange 6A of the slide pin 6 to urge the slide pin 6 in an axial backward or retracting direction. The slide pin 6 has a clamp cam surface 6B for forcing the balls 5 radially outwardly into fitting engagement with the ball engagement groove 4 when the slide pin 6 is urged backward, and an unclamp space or gap 6C, defined between the slide pin 6 and the shank portion 3, to allow the balls 5 to move radially inwardly out of engagement with the ball engagement groove 4 when the slide pin 6 is advanced. The shank portion 3 has a releasing cam surface 8, facing the ball engagement groove 4, to force the balls 5 into the space 6C when the tool T is detached from the tool pot 1.

Figure 1A:
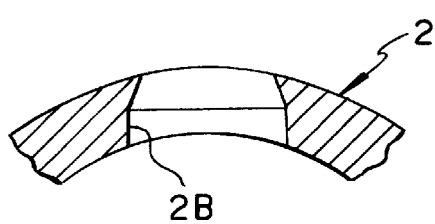
FIG. 1A is an enlarged sectional view, transverse to the cross-sectional view of the tubular portion 2C, FIG. 1, showing the configuration of the radial ball hole 2B with the ball 5 removed.
Figure 1B:
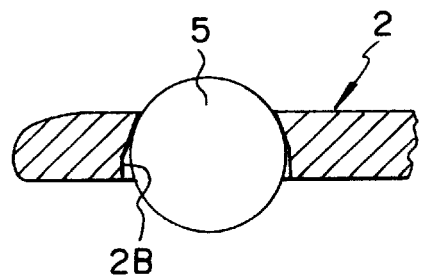
FIG. 1B is an enlarged sectional view, axial to the cross-sectional view of the tubulasr portion, FIG. 1, showing the radial configuration of the ball hole 2B with the ball 5 in the ball hole, as shown in FIG. 1, with the outer peripheral surface of the ball hole smaller than the diameter of the ball.

As best shown in FIGS. 1A and 1B, holes 2B, for freely movably holding the balls 5, have an end opening at an outer peripheral surface of the tubular portion 2C and having a size slightly smaller than the diameter of the balls 5 for preventing the balls 5 from displacing off the ball holder 2 in the radial outward direction. The ball holder 2 has a portion, forming a steplike projection 2D, provided for abutting engagement with a recessed portion 3A, formed in a part of the shank portion 3 of the tool T, so as to determine or fix the depth of insertion of the tool T relative to the tool pot 1.

When the slide pin 6 is advanced by an external force against the force of the spring 7, the tool T can be detached from the tool pot 1. When the external force is released, the slide pin 6 is urged backward by spring 7 whereupon the tool T is firmly held at its shank portion 3 within the tool pot 1.

Figure 2:
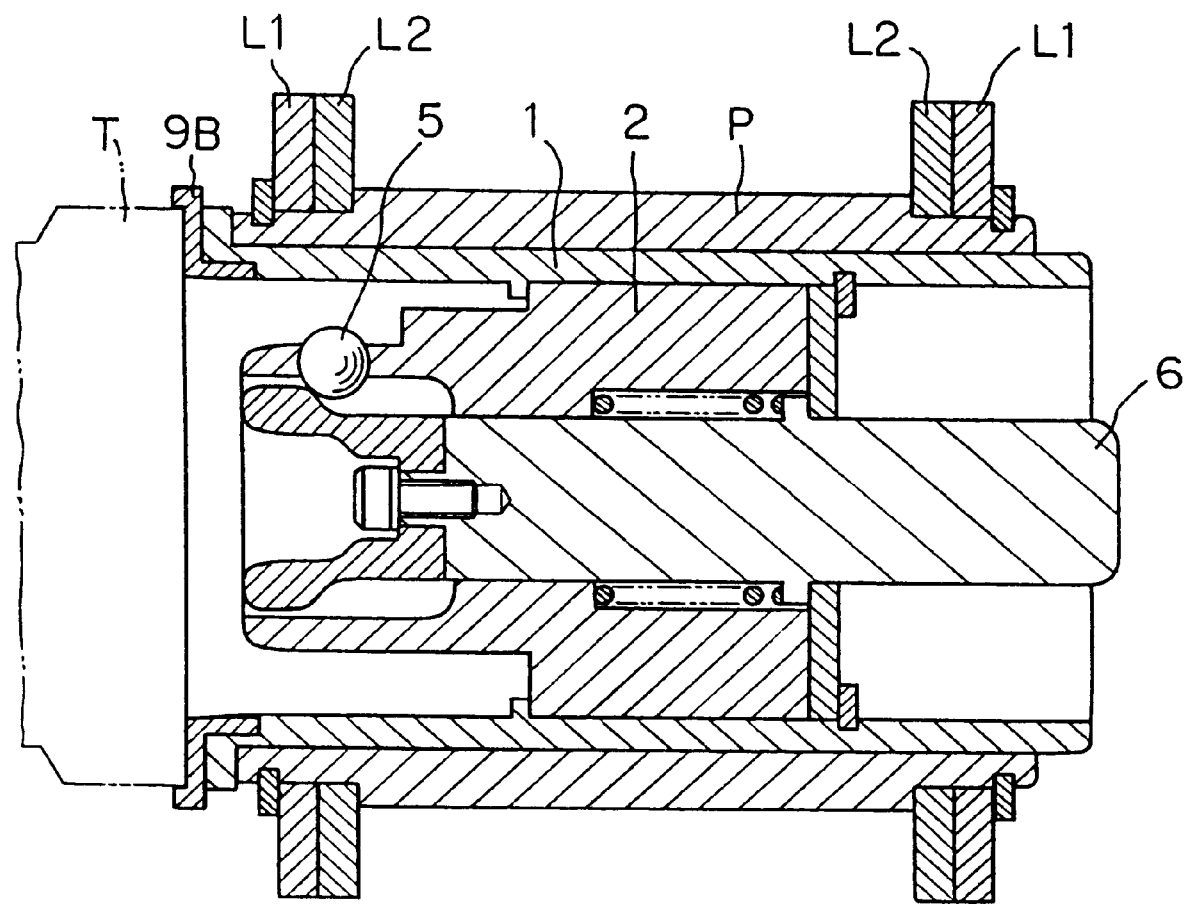
FIG. 2 is a front elevational, cross-sectional view of a main portion of a chain having a hollow connecting pin in which a tool pot of this invention is mounted.
Figure 3:
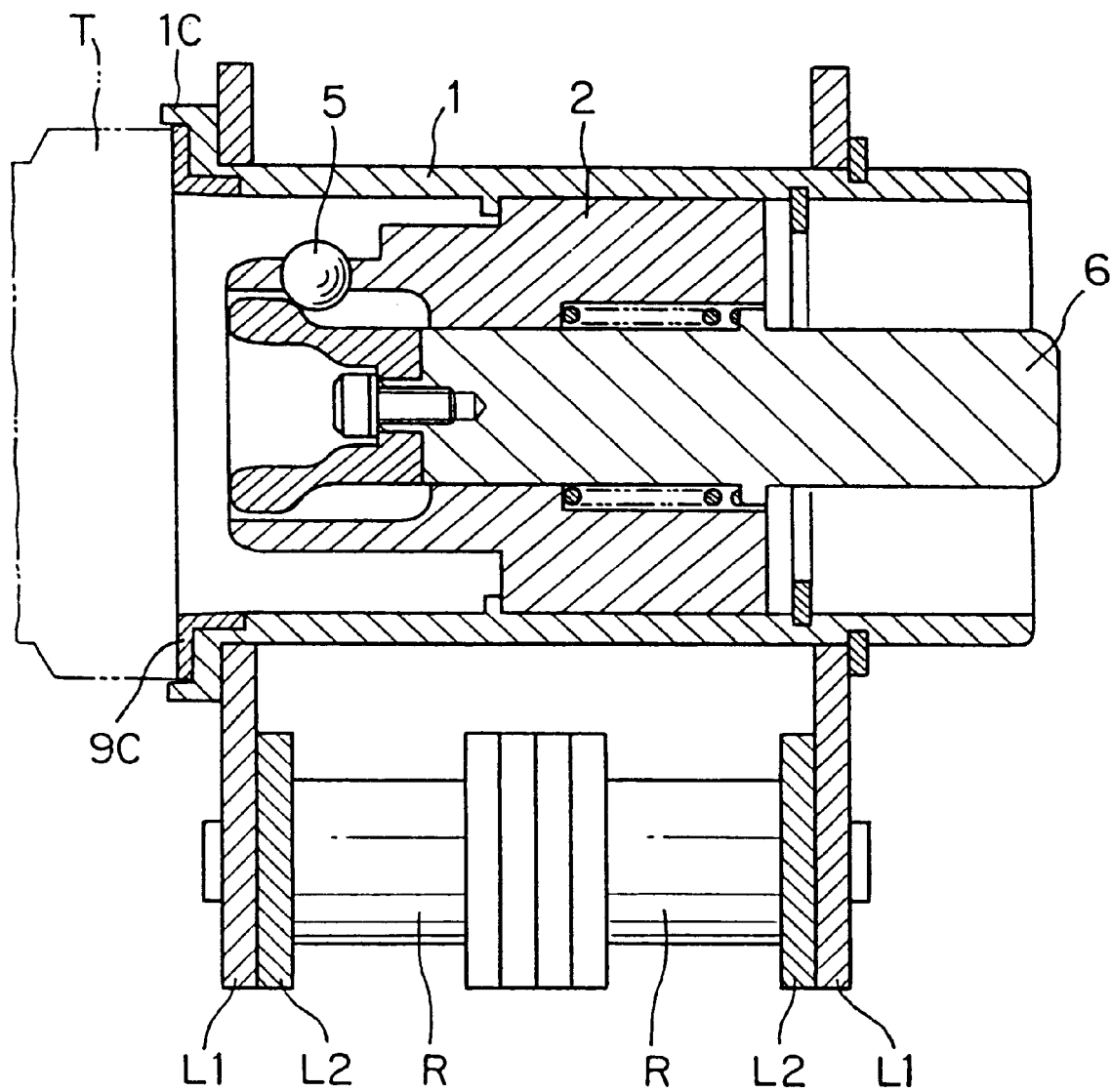
FIG. 3 is a front elevational, cross-sectional view of a main portion of a chain having chain links with which a tool pot of this invention is fitted.

FIG. 2 shows another embodiment in which the tool pot 1' is mounted in a hollow connecting pin P, interconnecting a pair of outer links L1 and a pair of inner links L2 of a chain. FIG. 3 shows a further embodiment in which the tool pot 1" is firmly fitted in respective through-holes in upper extensions of a pair of outer links L1' of a roller chain including rollers R. Reference character L2' denotes a pair of inner links.

In FIGS. 1–3, reference characters 9A, 9B and 9C denote seal members in the different embodiments which are fitted on a flange surface of the tool pot 1, 1'; 1" for abutting engagement with an end face TA of a flange of the interchangeable tool T. In the embodiment shown in FIG. 1, the seal member 9A prevents oil or suspended foreign matter, such as dust and dirt, from entering the interface between the flange end surface TA of the tool T and the flange surface of the tool pot 1. The seal member 9B shown in FIG. 2 has a bent portion fitted around an outer peripheral surface of a flange of the interchangeable tool T. The seal member 9C shown in FIG. 3 is combined with a bent portion 1C formed on the flange surface of the tool pot 1 and fitted around an outer peripheral surface of the flange of the interchangeable tool T. With the bent portion 1C thus provided, the seal member 9C is protected against damage when it is subjected to an external impact force.

The seal members 9A–9C may have a portion extending over an inner peripheral surface of the tool pot 1 for sealing engagement with the shank portion 3 of the tool T to improve the accuracy of attachment of the tool in the axial direction of the same.

According to the present invention, a tool is fitted in and held by a tool pot with a slide pin urged backward in the axial direction. The tool can be attached to and detached from the tool pot when the slide pin is moved forwardly by an external force against the backward urging force. Thus, because the attachment and detachment of the tool with respect to the tool pot is achieved directly when the slide pin is actuated, tool attaching and detaching operation can be achieved reliably with a simple construction. In addition, clamping and unclamping of the tool can be achieved in a proper manner, thus making it possible to exchange tools smoothly without causing a tool fall-off problem. Furthermore, a seal member disposed at the interface between an end face of a flange of the tool and a flange surface of the tool pot can protect the interface against intrusion of a foreign matter and ensure a close contact with the tool's flange end face and the tool-pot's flange surface with the result that a desired fitting accuracy of the tool in the axial direction of the same can be maintained.

We claim:

1. A tool holding device comprising: a tool pot releasably fitting an interchangeable tool therein, a ball holder firmly fitted in said tool pot and having a guide surface around which a shank portion of said tool is releasably fitted, and a tubular portion having formed therein a plurality of circumferentially spaced radial holes freely movably holding respectively therein balls releasably engageable with a ball engagement groove formed in an inner peripheral surface of the shank portion of said tool, said radial holes having a diameter slightly smaller than the diameter of the balls for preventing said balls from displacing off of said ball holder and a slide pin inserted in said ball holder and normally urged backward in an axial direction, said slide pin having a clamp cam surface for causing said balls to move into engagement with the ball engagement groove in the shank portion of said tool when said slide pin is urged backward, and an unclamp space for allowing said balls to move out of engagement with the ball engaging groove when the slide pin is advanced, said shank portion of said tool having a releasing cam surface defining a portion of said ball engagement groove for forcing said balls to move into said unclamp space in said slid pin when the tool is detached, said tool pot having a flange surface, said interchangeable tool having a flange end face held in abutment with said flange surface, and a seal member attached to said flange surface, said seal member extending radially outwardly between said flange surface on said tool pot and said flange end face of said interchangeable tool and axially along an outer peripheral surface of said shank portion of said tool and an inner peripheral portion of said tool pot adjacent said tool pot flange surface, said seal member preventing foreign matter from entering into said tool pot at said tool pot flange, improving accuracy of attachment of said tool to said tool pot in an axial direction of said tool, protecting said tool and said tool pot from damage and preventing vibration between said tool and said tool pot.

* * * * *